United States Patent [19]

Yamada et al.

[11] Patent Number: 5,776,610
[45] Date of Patent: Jul. 7, 1998

[54] CARBON COMPOSITE ELECTRODE MATERIAL AND METHOD OF MAKING THEREOF

[75] Inventors: Kazuo Yamada; Hideaki Tanaka; Takehito Mitate; Masaharu Yoshikawa, all of Nara-ken, Japan

[73] Assignee: Sharp Kabushiki Kaisha, Osaka, Japan

[21] Appl. No.: 729,170

[22] Filed: Oct. 11, 1996

Related U.S. Application Data

[62] Division of Ser. No. 323,572, Oct. 17, 1994, Pat. No. 5,595,838, which is a division of Ser. No. 13,029, Feb. 3, 1993, abandoned.

[51] Int. Cl.$^6$ ..................................................... B32B 5/16
[52] U.S. Cl. ..................... 428/403; 427/215; 427/217; 428/408; 429/218; 429/232
[58] Field of Search ..................... 428/403, 408; 427/215, 217; 429/218, 219, 232, 209, 197, 94

[56] References Cited

U.S. PATENT DOCUMENTS

| | | | |
|---|---|---|---|
| 4,968,527 | 11/1990 | Yoshimoto et al. | 427/122 |
| 5,482,797 | 1/1996 | Yamada et al. | 429/218 |
| 5,591,547 | 1/1997 | Yoneda et al. | 429/218 |
| 5,595,838 | 1/1997 | Yamada et al. | 429/209 |
| 5,643,695 | 7/1997 | Barker et al. | 429/197 |
| 5,654,114 | 8/1997 | Kubota et al. | 429/218 |

FOREIGN PATENT DOCUMENTS

| | | |
|---|---|---|
| 0 239 410 | 9/1987 | European Pat. Off. . |
| 0 334 501 | 9/1989 | European Pat. Off. . |
| 0 346 088 | 12/1989 | European Pat. Off. . |
| 0 419 090 | 3/1991 | European Pat. Off. . |

*Primary Examiner*—H. Thi Le
*Attorney, Agent, or Firm*—David G. Conlin; George W. Neuner

[57] ABSTRACT

A method for manufacturing a carbon composite electrode material which comprises coating the surface of core carbon particles with high crystallinity with a film containing a element of Group VIII metal and depositing and/or covering the surface of resulting coated carbon particles with a carbon material to be formed upon pyrolysis of a hydrocarbon or its derivative.

12 Claims, 2 Drawing Sheets

CARBON COMPOSITE ELECTRODE MATERIAL AND METHOD OF MAKING THEREOF

This is a divisional of application Ser. No. 08/323,572 on Oct. 17, 1994 now U.S. Pat. No. 5,595,838 which is a divisional of Ser. No. 08/013,029 filed on Feb. 3, 1993 (now abandoned).

BACKGROUND OF THE INVENTION

1. Field of the invention

The present invention relates to a method for manufacturing a carbon composite material. More particularly, it relates to a method for manufacturing a carbon composite electrode material used as a negative electrode active material in lithium secondary batteries.

2. Description of the Related Art

It was reported that when a certain type of carbon material, of carbon composite electrode materials, is used as a negative electrode active material in lithium secondary batteries, the charge-discharge cycle characteristic and safety of the secondary batteries is excellent (for example, Japanese Patent Unexamined Publication Nos. Sho 63-24555 and Hei 1-311565). This carbon material is manufactured, for example, by chemical vapor deposition (CVD) of a hydrocarbon.

The inventors of this application found out and disclosed the fact that outstandingly excellent as the negative electrode active material in lithium secondary batteries was particularly a carbon material of a structure such that its internal layer had high crystallinity and that its surface layer was coated with a carbon having a turbulent layer structure (Japanese Patent Application No. Hei 3-144547).

As manufacturing methods of carbon composite electrode materials, there is available a method of forming and depositing a carbon material through chemical vapor depositon any hydrocarbon or its derivatives on the surface of such a carbon material as graphite used as its core material. In this instance, the deposited carbon material shows a turbulent layer structure. The system needs to be held at about 1000° C. for a long period of time so to deposit the carbon material having such a turbulent layer structure. Under such conditions, this method is not practically useful, because a large amount of a tarry product is generated by side reactions.

SUMMARY OF THE INVENTION

The present invention provides a method for manufacturing a carbon composite electrode material which comprises coating the surface of core carbon particles with high crystallinity with a film containing a element of Group VIII metal and depositing and/or covering the surface of resulting coated carbon particles with a carbon material to be formed upon pyrolysis of a hydrocarbon or its derivative.

Desirable carbon material should be formed by pyrolysis in vapor phase or aerosol state of any hydrocarbon or its derivatives and the crystal structure of the carbon particles are consisted of a mean interlayer spacing of approx. 0.335–0.340 nm in the C-axis direction and a ratio of intensity of lower than about 0.4 at 1360 cm$^{-1}$ to that at 1580 cm$^{-1}$ of the argon laser Raman spectra method.

Further, the element of Group VIII metal should desirably be nickel, cobalt or iron or their alloys and the thickness of the film containing the element 0.1–2.0 µm.

Furthermore, the carbon composite electrode material is desirable to be employed as a negative electrode active material in lithium secondary batteries.

DETAILED DESCRIPTION OF THE INVENTION

Figure 1:
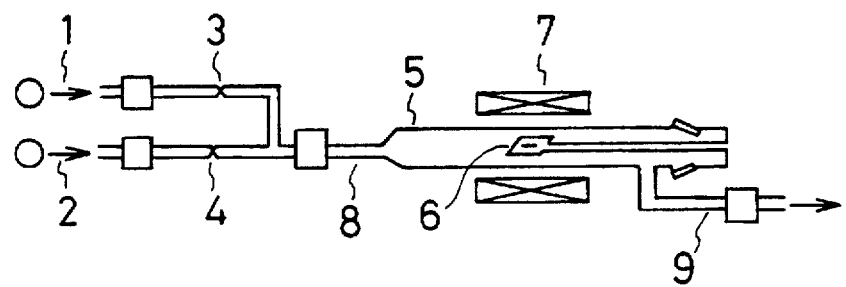
FIG. 1 is a schematic diagram of a carbon material pyrolysis and depositing apparatus used in an embodiment of this invention.

The present invention provides a method for manufacturing carbon composite electrode material which is coated by carbon material on the surface of the core carbon particles with high crystallinity, relatively a low temperature, in a short time and in order to increase the specific surface area of the carbon composite.

The core carbon particles with high crystallinity of the present invention are natural graphite, kish graphite, or carbons obtained by heat treating at such a high temperature as above 2000° C. such a well-known carbon material as petroleum coke or coal pitch coke or the like graphitizing carbons. Their mean particle size should desirably be not larger than 100 µm, particularly about 1–20 µm. If its particle size falls in this range, its utilization rate as an active material is high and the filling density of the negative electrode active material may be made high. The mean particle size is given by measuring and averaging the particle sizes distributed per unit volume.

Its form may include either spherical, flaky crystal or fibrous or their pulverulences, but the spherical or flasky crystal form is preferable.

Further, its desirable crystal structure should have a mean interlayer spacing of 0.335–0.340 nm, as determined by the X-ray wide angle diffraction method, and lower than about 0.4 as a ratio of the peak intensity at 1360 cm$^{-1}$ to that at 1580 cm$^{-1}$ in the argon laser Raman scattering method. The core carbon particles with high crystallinity of the present invention are coated with a film containing a Group VIII metal. The elements of Group VIII metal of the present invention include iron, nickel, cobalt, ruthenium, rhodium, paradium, osmium, iridium and platinum and their alloys. Among them, iron, nickel and cobalt are preferable.

The coating methods include electroless plating process or a vapor deposition process of evaporating by heating the aforementioned Group VIII metal held under a highly reduced pressure, and sputtering process to form a metal film by the ion impact, and so on. The electroplating process or the electroless plating process is preferable in views of economy and productivity.

In the electroless nickel plating process, a plating bath is prepared with approx. 20 of $NiSO_4 \cdot 7H_2O$ and approx. 25 of $NaH_2PO_2$ in ratio by weight with its pH adjusted to approx. 5.0 and the core carbon particles are dipped into this plating bath. Then by adding such a reducing agent as phosphate or sodium hydrogen boride to this plating bath, while holding it at about 90° C. a metal film is formed on the surface of the carbon particles with high crystallinity. For these plating baths and the reducing agents, those prepared and available on the commercial may be utilized (for example, TMP Kagaku nickel: mfd. by Okuno Seiyaku Kogyo K.K.).

The average thickness of the coated film containing a Group VIII metal should preferably be 0.01–2.0 µm. If it is thinner than 0.01 μm, its effect as a catalyst is slight, but if thicker than 2.0 μm, the rates of intercalation and deintercalation into and from the internal carbon material are slow.

As the film containing a Group VIII metal, a carbon material is formed, deposited and/or covered through pyrolysis of a hydrocarbon or its derivatives in vapor phase or in the state of aerosol. The hydrocarbons and their derivatives include aliphatic or aromatic or alicyclic hydrocarbons and their partly substituents (halogen atoms, hydroxyl, sulfo, nitro, amino and carboxyl groups, etc.). Their actual examples include: methane, ethane, propane, butane, pentane, hexane, cyclohexane, naphthalene, anthracene, pyrene, benzene, toluene, pyridine, allyl benzene, hexamethyl benzene, aniline, phenol, 1,2-dichloroethylene, 1,2-dibromoethylene, 2-butene, acetylene, biphenyl, diphenyl acetylene, styrene, acrylonitrile, pyrrole and thiophene and their derivatives. Of these compounds, methane, ethane and propane are preferable, because they are not expensive, their waste gases are readily treatable and they are not liable to corrode the pyrolysis furnace.

Any of the aforementioned hydrocarbons or its derivatives in gas phase or in aerosol state is (are) fed to a carbon pyrolysis and depositing apparatus, to be carried onto a film containing a Group VIII metal which is placed on a holder for depositing carbon material. As the reaction conditions at that time, the feed rate of the gas phase material or the aerosol is 0.03–20 mols/hr and its flow rate 5–100 cm/min. This pyrolysis is performed at a temperature of approx. 300°–1300° C. preferably approx. 500 °–1100° C. in a noncombustible atmosphere, for example, under reduced pressure or in an inert gas. In this way, a carbon composite electrode material with a particle size of approx. 15–50 μm is obtained.

In this carbon composite electrode material, core carbon particles with high crystallinity are coated with a film containing a Group VIII metal and on their film surface, there is further formed a carbon material through pyrolysis and depositing of a hydrocarbon or its derivatives in gas phase or in the aerosol. Accordingly, it has the undermentioned characteristic features.

First, since the Group VIII metal acts as a catalyst for the pyrolysis reaction of the hydrocarbon or its derivatives in gas phase or in aerosol state, the carbon material can be relatively formed and deposited at a low temperature and in a short time.

Secondly, a part or all film of the Group VIII metal diffuses into the carbon material formed, deposited and/or covered thereon during the aforementioned pyrolysis, the core carbon particles with high crystallinity are directly covered with the carbon material formed and deposited through pyrolysis.

Thirdly, the carbon material of the surface layer of the carbon composite electrode material is a carbon material formed and deposited through pyrolysis of a hydrocarbon. Therefore, it is a carbon material of the so-called turbulent layer structure which permits easy intercalation and deintercalation of lithium ion, etc. The carbon material with turbulent layer structure refers to a material having a crystal structure which gives a mean lattice width of 0.377 nm or larger in its C-axis direction and which gives a ratio of 0.4 or higher of the peak intensity at 1360 cm$^{-1}$ to that at 1580 cm$^{-1}$ of the argon laser Raman spectra.

EXAMPLES

Example 1

As core carbon particles with high crystallinity, 5.014 g of a powder (mean particle size 18.0 μm, average lattice width of 0.3358 nm in the C-axis direction and the peak at 1360 cm$^{-1}$ in its argon laser Raman spectra not observed) of graphite (KS-75, mfd. by Lonza Co.) were taken and coated with nickel by the electroless nickel plating process. In forming the nickel film, the powder was subjected to a sensitization treatment as a pretreatment, using MAC-100 (mfd. by Okuno Seiyaku Kogyo K.K.), thoroughly water-rinsed, then subjected to an activation treatment with MAC-200 (mfd. by Okuno Seiyaku Kogyo K.K.), followed by thorough water-rinsing, and thereafter underwent the plating process. The film was formed using TMP Kagaku nickel (mfd. by Okuno Seiyaku Kogyo K.K.) as the plating bath at approx. 35° C. while stirring the bath with a stirrer.

Since the weight of graphite, after coated with the film, was 10.128 g, the mean nickel film thickness was calculated to be 0.79 μm from the increment of its weight and its mean particle size.

The graphite coated with nickel film obtained in this way was mounted on a holder of a carbon pyrolysis and depositing apparatus. Then using the carbon pyrolysis and depositing apparatus shown in FIG. 1, the formation, deposition and/or covering of the carbon material through pyrolysis of any hydrocarbon was carried out by the undermentioned procedure.

Through an argon feeding line 1 and a propane feeding line 2, argon and propane gases were respectively fed into this apparatus. By operating needle valves 3 and 4, the concentration of propane was adjusted to 10 mol% The current velocity of both gases was preset to 12.7 cm/min and propane was fed at a rate of 0.05 mol/hr. On the other hand, on the sample holder 6 inside the reactor tube 5, the graphite coated with the nickel film was mounted and a furnace was installed on the outer circumference of the reactor tube 5. By this furnace 7, the sample holder 6 and the graphite coated with the nickel film were held at a temperature of 750° C. to pyrolysis of the propane fed through a pipe 3 made of Pyrex glass, thereby forming and depositing the carbon material on the surface of the nickel film coating the graphite, yielding particles of a carbon composite electrode material. The reaction time at this time was set at approx. 30 min. The mean particle size of the carbon composite electrode material obtained at this time was approx. 25.1 μm, as determined by laser diffraction particle analyzer. However, there is a possibility that the observed particles are consisted of the mixture of those cohered each other and those not cohered, since the particles were deposited and cohered each other through the reaction.

It should be noted that the gas remaining in the reactor tube after the pyrolysis reaction was removed by exhausting through an exhaust facility 9.

With regard to the crystalline structure of the carbon composite electrode material obtained in this way, results of measurements of its X-ray diffraction and argon laser Raman spectra gave the undermentioned data:

d=0.3373 nm and R=0.48

In this case, X-ray by CuKα line was employed for the X-ray diffraction and d represents a mean interlayer spacing. R denotes the ratio of the peak intensity at 1360 cm$^{-1}$ to that at 1580 cm$^{-1}$ of the argon laser Raman spectra.

About 30 mg of this carbon composite electrode material was mixed with 5% by weight of a polyolefin as a binder. It was then hot-pressed on a nickel mesh at about 120° C. and under about 400 kg/cm$^2$, yielding a pellet with an approx. 15 mm dia. This pellet was named test electrode A.

Comparative Example 1

Using the powder of the graphite (KS-75, mfd. by Lonza Co.) of Example 1 as the core carbon particles with high crystallinity, the carbon composite electrode material was prepared under the similar conditions, except that they were not coated with the nickel film. When the measurements were taken of the characteristics of the crystal structure obtained in this way under the similar conditions as in Example 1, the results gave the undermentioned data:

d=0.3360 and R=0.15

The aforementioned interlayer spacing was found to be nearly equal to that of graphite, attesting to the fact that under such conditions as in Example 1, noncrystalline carbon material is hardly formed on the graphite surface.

Measurement results of the specific surface area by the BET method suggested that the carbon composite electrode material of Example 1 has 12 times as large a specific surface area as that of the carbon composite electrode material of Comparative Example 1.

Further, from about 30 mg of this carbon composite electrode material, a pellet with an approx. 15 mm dia. was obtained by the similar method as in Example 1. This pellet was named comparative electrode.

EXAMPLE 2

A powder of the graphite (KS-75, mfd. by Lonza Co.) of Example 1 used as the core carbon particles with high crystallinity was coated with cobalt by electroless cobalt plating process. The powder was dipped in a cobalt plating bath, after subjecting it to the pretreatment and the activation treatment under the similar conditions as in Example 1. The plating bath was prepared by mixing 0.13 mol/l of $CoCl_3 \cdot 6H_2O$ and 0.05 mol/l of sodium hypophosphite and with this bath, the cobalt was plated on the powder at a temperature of 80° C. The plated cobalt film thickness, as measured by the similar method as in Example 1, was approx. 0.51 µm.

The carbon material was formed, deposited and/or covered, to prepare the carbon composite electrode material, similarly as in Example 1, except using the graphite coated with the cobalt film obtained in this way. The mean particle size of the carbon composite electrode material at this time was found to be about 28.3 µm, as determined by laser diffraction particle analyzer. The results of the measurements on the characteristics of this crystal structure, as taken under the similar conditions as in Example 1, gave the undermentioned data d=0.3375 and R=0.51

Further a pellet with an approx. 15 mm dia. was obtained from about 30 mg of this carbon composite electrode material by the similar method as in Example 1. This pellet was named test electrode B.

EXAMPLE 3

A powder of the graphite (KS-75, mfd. by Lonza Co.) of Example 1 used as the core carbon particles with high crystallinity was coated with nickel-iron alloy by electroless nickel-iron plating process. The powder was dipped in a nickel-iron alloy plating bath, after subjecting it to the pretreatment and the activation treatment under the similar conditions as in Example 1. The plating bath was prepared by mixing 0.05 mol/l of $NiSO_4 \cdot 6H_2O$, 0.05 mol/l of ammonium iron (II) sulfate, 0.16 mol/l of sodium citrate and 0.5 mol/l of ammonium sulfate and with this bath, the powder was plated with nickel-iron at about 90° C. The plated film thickness, as measured by the similar method as in Example 1, was found to be approx. 0.80 µm. The mean particle size of the carbon composite electrode material at this time was found to be about 28.3 µm, as determined by observation by laser diffraction particle analyzer.

The carbon material was formed and deposited, to prepare the carbon composite electrode material, similarly as in Example 1, except using the graphite coated with the nickel-iron alloy film obtained in this way. The results of measurements on the characteristics of this crystal structure, as taken under the similar conditions as in Example 1, gave the undermentioned data:

d=0.3386 and R=0.49

Further a pellet with an approx. 15 mm dia. was obtained from about 30 mg of this carbon composite electrode material by the similar method as in Example 1. This pellet was named test electrode C.

EXAMPLE 4

A powder of the graphite (KS-75, mfd. by Lonza Co.) of Example 1 used as the core carbon particles with high crystallinity was coated with nickel by the nonelectrolytic nickel plating process similarly as in Example 1.

The formation and deposition of the carbon material was made through pyrolysis of a hydrocarbon by the similar procedure as in Example 1, using the carbon pyrolysis and depositing apparatus shown in FIG. 1. At this time, in place of propane, benzene was used as the raw material hydrocarbon. The conditions of the pyrolysis were: The current velocity of the gases 25.5 cm/min, its feed rate 0.15 mol/hr, the reaction temperature approx. 650° C. and the reaction time approx. 30 min. The mean particle size of the carbon composite electrode material at this time was found to be abot 29.3 µm, as determined by laser diffraction particle analyzer.

The results of the measurements on the characteristics of the crystal structure of this carbon composite electrode material, as taken under the similar conditions as in Example 1, gave the undermentioned data:

d=0.3385 and R=0.43

Further, a pellet with an approx. 15 mm dia. was obtained from about 30 mg of this carbon composite electrode material by the similar method as in Example 1. This pellet was named test electrode D.

EXAMPLE 5

A powder of the graphite (KS-75, mfd. by Lonza Co.) of Example 1 used as the core carbon particles with high crystallinity was coated with nickel by the electroless nickel plating process similarly as in Example 1.

The formation and deposition of the carbon material was made through pyrolysis of a hydrocarbon by the similar procedure as in Example 1, using the carbon pyrolysis and depositing apparatus shown in FIG. 1. At this time, in place of propane, 2-dichloroethylene was used as the raw material hydrocarbon. The conditions of the pyrolysis were: The flow rate of the gases 18.5 cm/min, its feed rate 0.12 mol/hr, the reaction temperature approx. 650° C. and the reaction time approx. 30 min. The mean particle size of the carbon composite electrode material at this time was found to be about 34.5 µm, as determined by laser diffraction particle analyzer.

The results of the measurements on the characteristics of the crystal structure of this carbon composite electrode material, as taken under the similar conditions as in Example 1, gave the undermentioned data:

d=0.3412 and R=0.55

Further, a pellet with an approx. 15 mm dia. was obtained from about 30 mg of this carbon composite electrode material by the similar method as in Example 1. This pellet was named test electrode E.

EXAMPLE 6

About 5 g of a powder of natural graphite (produced in Madagascar, its mean particle size 6.2 μm, d=0.3363 nm, no peak at 1360 cm$^{-1}$ in the argon laser Raman spectra observed) used as the core carbon particles with high crystallinity was coated with nickel by the electroless nickel plating process. The pretreatment and the activation treatment for forming the nickel film were similarly performed as in Example 1 and then the powder was submitted to the plating process. A nickel film was formed in the plating bath of a mixture of 30 g/l of NiSO$_4$·6H$_2$O, 10 g/l of sodium acetate and 10 g/l of sodium hypophosphite at about 90° C. From the weight of the graphite thus coated, the mean film thickness of the nickel film was calculated to be 0.70 μm.

Similarly as in Example 1, a carbon composite electrode material was prepared by forming and depositing a carbon material on the plated particles. The mean particle size of the carbon composite electrode material at this time was approx. 14.1 μm, as determined by laser diffraction particle analyzer. The results of the measurements on the characteristics of the crystal structure, as taken under the similar conditions as in Example 1, gave the undermentioned data:

d=0.3378 and R=0.51

Further, a pellet with an approx. 15 mm dia. was obtained from about 30 mg of this carbon composite electrode material by the similar method as in Example 1. This pellet was named test electrode F.

EXAMPLE 7

About 5 g of mesophase spherules carbonized and further heat-treated at 2800° C. (their mean particle size 5.8 μm, d=0.3368 nm and R=0.35) used as the core carbon particles with high crystallinity were coated with nickel by the electroless nickel plating process. Their pretreatment and activation treatment for forming the nickel film were similarly performed as in Example 1 and then the spherules were submitted to the plating process. A nickel film was formed in the plating bath of a mixture of 30 g/l of NiSO$_4$·6H$_2$O, 50 g/l of ammonium chloride with 10 g/l of sodium hypophosphite at about 90° C. From the weight of the graphite thus coated, the mean film thickness of the nickel film was calculated to be 0.84 μm.

Similarly as in Example 1, a carbon composite electrode material was prepared by forming, depositing and/or covering a carbon material on the plated spherules. The mean particle size of the carbon composite electrode material at this time was approx. 12.6 μm, as determined by laser diffraction particle analyzer. The results of the measurements on the characteristics of the crystal structure, as taken under the similar conditions as in Example 1, gave the undermentioned data:

d=0.3397 and R=0.62

Further, a pellet with an approx. 15 mm dia. was obtained from about 30 mg of this carbon composite electrode material by the similar method as in Example 1. This pellet was named test electrode G.

EXAMPLE 8

A carbon composite electrode material was prepared similarly as in Example 7, except that mesophase spherules which had been carbonized and further heat-treated at 2000° C. (their mean particle size 16.4 μm, d=0.3385 nm, R=0.39) were used as the core carbon particles with high crystallinity. The mean thickness of the nickel film at this time was found to be 1.72 μm and the mean particle size of the carbon composite electrode material was 25.3 μm. The results of the measurements on the characteristics of the crystal structure, as taken under the similar conditions as in Example 1, gave the undermentioned data:

d=0.3410 and R=0.53

Further, a pellet with an approx. 15 mm dia. was obtained from about 30 mg of this carbon composite electrode material by the similar method as in Example 1. This pellet was named test electrode H.

Figure 2:
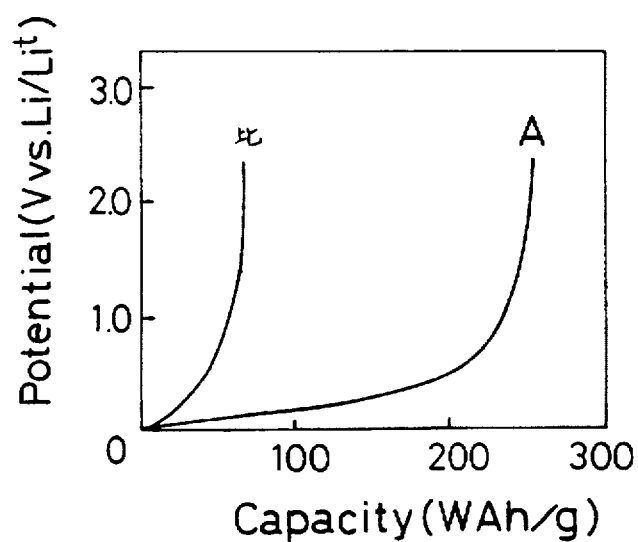
FIG. 2 is a diagrammatic representation of discharging curves for the test electrode A in an embodiment and a comparative electrode.
Figure 3:
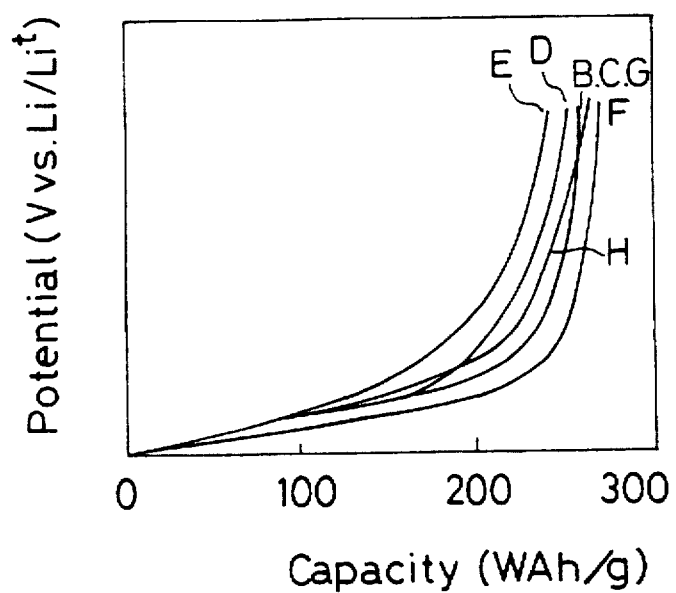
FIG. 3 is a diagrammatic representation of discharging curves for other test electrodes B, C, D, E, F, G and H in embodiments of this invention.

With the test electrodes A through H and the comparative electrode above mentioned, charge-discharge tests were carried out in the range of 0–2.5 V. As the working electrode, the test electrodes and the comparative electrode were used and as the counter electrode and the reference electrode, lithium metal was used. As the electrolyte, propylene carbonate having 1 mol/l of LiClO$_4$ dissolved therein was used. The charge-discharge test was carryed out in a globe box in an argon atmosphere. The discharge curves obtained at that time were depicted in FIGS. 2 and 3. These graphs indicate that, as compared with the comparative electrode, all of the test electrodes A through H gave higher discharge capacity.

According to this invention, a carbon material having an inside layer with high crystallinity and an outside layer with turbulent crystal structure could be relatively manufactured at a low temperature and in a short time. In cells using the carbon composite electrode material obtained by this manufacturing method as their negative electrode active substance, the charge-discharge capacity and rate was remarkably improved because of larger surface area of the electrode.

What is claimed is:

1. A particulate carbon material comprising a plurality of carbon particles, each particle having a crystalline carbon core-coated with a carbon material in which an element of group VIII metal is diffused.

2. A particulate carbon material of claim 1, wherein the carbon material has a degree of crystallinity lower than that of the crystalline carbon core.

3. A particulate carbon material of claim 1, wherein the crystalline carbon core has an interlayer distance d(002) in the c-axis direction of from 0.335 to 0.340 nm and a ratio of the peak intensity at 1360 cm$^{-1}$ to that at 1580 cm$^{-1}$ in its argon laser Raman scattering spectra, which ratio is less than 0.4.

4. A particulate carbon material of claim 1, wherein the crystalline carbon core is selected from the group consisting of natural graphite, kish graphite, and graphitizing carbons obtained by heat treating at a temperature above about 2000° C.

5. A particulate carbon material of claim 1, wherein the carbon material, in which an element of Group VIII metal is diffused, has an interlayer distance d(002) in the c-axis direction of 0.337 nm or more and has a ratio of the peak intensity of 1360 cm$^{-1}$ to that at 1580 cm$^{-1}$ in its argon laser Raman scattering spectra, which ratio is 0.4 or more.

6. A particulate carbon material of claim 1, wherein the element of Group VIII metal is selected from the group consisting of nickel, iron, cobalt and an alloy thereof.

7. A negative electrode for use in a lithium secondary battery, wherein the electrode is made from the particulate carbon material of claim 1.

8. An electrode for use in a non-aqueous secondary battery, wherein the electrode is made from the particulate carbon material of claim 1.

9. A particle carbon material of claim 1, which is manufactured by:

coating the surface of the crystalline carbon core with a film containing the element of Group VIII metal or alloy thereof to obtain metal coated cystalline carbon core, and depositing the carbon material on the surface of the resulting metal coated crystalline carbon core.

10. A particle carbon material of claim 9, wherein the crystalline carbon core has an interlayer distance d(002) in the c-axis direction of from 0.335 to 0.340 nm and a ratio of the peak intensity at 1360 cm$^{-1}$ to that at 1580 cm$^{-1}$ in its argon laser Raman scattering spectra, which ratio is less than 0.4.

11. A particle carbon material of claim 9, wherein the step of depositing carbon material on the metal coated crystalline carbon core includes pyrolyzing a hydrocarbon.

12. A particle carbon of claim 9, wherein the element of Group VIII metal is selected from the group consisting of nickel, iron, cobalt and an alloy thereof.

* * * * *